(12) United States Patent
Kume et al.

(10) Patent No.: US 10,059,229 B2
(45) Date of Patent: Aug. 28, 2018

(54) SEAT SLIDING DEVICE FOR VEHICLE

(71) Applicant: TOYOTA BOSHOKU KABUSHIKI KAISHA, Aichi (JP)

(72) Inventors: Sho Kume, Aichi (JP); Hideki Fujisawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/708,904

(22) Filed: Sep. 19, 2017

(65) Prior Publication Data
US 2018/0086230 A1    Mar. 29, 2018

(30) Foreign Application Priority Data

Sep. 27, 2016    (JP) .................................. 2016-188107

(51) Int. Cl.
*B60N 2/00*    (2006.01)
*B60N 2/07*    (2006.01)

(52) U.S. Cl.
CPC ......... *B60N 2/0722* (2013.01); *B60N 2/0705* (2013.01); *B60N 2/0715* (2013.01)

(58) Field of Classification Search
CPC .................................................. B60N 2/0705
USPC ....................................... 248/424, 429, 430
See application file for complete search history.

(56) References Cited

U.S. PATENT DOCUMENTS

| | | | | |
|---|---|---|---|---|
| 5,931,436 A * | 8/1999 | Rohee | ................. | B60N 2/0705 248/429 |
| 6,079,688 A * | 6/2000 | Levillain | .............. | B60N 2/0705 248/429 |
| 6,113,051 A * | 9/2000 | Moradell | ............. | B60N 2/0705 248/430 |
| 6,126,133 A * | 10/2000 | Timon | ................. | B60N 2/0705 248/429 |
| 6,641,104 B2 * | 11/2003 | Flick | .................... | B60N 2/0705 248/430 |
| 6,648,292 B2 * | 11/2003 | Flick | .................... | B60N 2/0705 248/430 |
| 8,215,602 B2 * | 7/2012 | Walter | ................. | B60N 2/0705 248/424 |

FOREIGN PATENT DOCUMENTS

JP    2010-036609    2/2010

* cited by examiner

*Primary Examiner* — Steven M Marsh
(74) *Attorney, Agent, or Firm* — Greenblum & Bernstein, P.L.C.

(57) ABSTRACT

A rolling element holder holds a rolling element rotatably and slidably. A biasing unit biases the rolling element holder toward a first surface of a fixed rail. A projection is provided on the rolling element holder, and faces a second surface opposite to the first surface. The rolling element holder is configured so that a distance in an up-down direction from a contact point between the rolling element and the first surface to an end portion of the projection on the second surface side becomes larger as the rolling element approaches an end on one side in a slidable range of the rolling element, and so that the projection is brought into contact with the second surface at least when the rolling element is at the end on the one side.

5 Claims, 10 Drawing Sheets

SEAT SLIDING DEVICE FOR VEHICLE

CROSS-REFERENCE TO RELATED APPLICATIONS

This application claims the benefit of Japanese Patent Application No. 2016-188107 filed on Sep. 27, 2016 with the Japan Patent Office, the entire disclosure of which is incorporated herein by reference.

BACKGROUND

The present disclosure relates to a seat sliding device for vehicle.

A seat sliding device for a vehicle disclosed in Japanese Patent Application Publication No. 2010-36609 (Patent Document 1) comprises a lower rail and an upper rail. The lower rail is provided on a floor side of the vehicle. The upper rail slidably engages with the lower rail. The upper rail is attached to a seat.

The upper rail comprises a rolling element. An outer peripheral surface of the rolling element is in contact with the lower rail. When the upper rail slides relative to the lower rail, the rolling element rolls.

The upper rail comprises a concave step in the vicinity of the rolling element. A shoe portion made of resin is attached to the concave step. The shoe portion is slidable in the concave step in a longitudinal direction of the upper rail. The shoe portion is brought into contact with the rolling element when it slides in a first direction in the concave step. The shoe portion moves away from the rolling element when it slides in a second direction opposite to the first direction in the concave step. In addition, the shoe portion is always in contact with the lower rail at its upper end.

When the upper rail slides in the second direction, a force in the first direction is applied to the shoe portion by the upper rail. Consequently, the shoe portion slides in the first direction in the concave step. Therefore, the shoe portion is brought into contact with the rolling element, and rolling resistance of the rolling element increases. As a result, resistance in sliding the upper rail increases.

In contrast, when the upper rail slides in the first direction, the shoe portion slides in the second direction in the concave step. Therefore, the shoe portion moves away from the rolling element, and rolling resistance of the rolling element does not increase. As a result, resistance in sliding the upper rail does not increase.

Accordingly, in the technique disclosed in Patent Document 1, when the upper rail slides in the second direction, resistance in sliding is large. When the upper rail slides in the first direction, resistance in sliding is small.

SUMMARY

In the technique disclosed in Patent Document 1, when a friction coefficient between the shoe portion and the lower rail is larger than a friction coefficient between the shoe portion and the concave step, the shoe portion slides in the concave step as described above in accordance with sliding of the upper rail, and resistance in sliding the upper rail changes.

It is difficult to accurately set the magnitude relation of the friction coefficient between the shoe portion and the lower rail and the friction coefficient between the shoe portion and the concave step. Therefore, it has been difficult to stably control resistance in sliding the upper rail.

In one aspect of the present disclosure, it is preferable to stably control resistance in sliding the upper rail.

A seat sliding device for conveyance that slides a seat in one aspect of the present disclosure comprises a fixed rail, a movable rail, a rolling element, a rolling element holder, a biasing unit, and a projection. The fixed rail is provided on a floor side of the conveyance. The movable rail, that slidably engages with the fixed rail, is attached to the seat. The rolling element holder is attached to the movable rail so as to be rotatable about a rotation shaft provided on the movable rail, and holds the rolling element rotatably and slidably in a longitudinal direction of the movable rail. The biasing unit biases the rolling element holder so that the rolling element rotates about the rotation shaft in a direction in which an outer peripheral surface of the rolling element approaches a first surface of the fixed rail. The projection is provided on the rolling element holder, and faces a second surface opposite to the first surface of the fixed rail when viewed from the rolling element holder. The rolling element holder is configured so that a distance in an up-down direction from a contact point between the rolling element and the first surface to an end portion of the projection on the second surface side becomes larger as the rolling element approaches an end on one side in a slidable range of the rolling element. The rolling element is configured so that, at least when the rolling element is at the end on one side, the projection is brought into contact with the second surface.

The seat sliding device for conveyance of the present disclosure can decrease resistance in sliding the movable rail to the one side, and increase resistance in sliding the movable rail to the other side opposite to the one side.

In the seat sliding device for conveyance of the present disclosure, change in resistance in sliding the movable rail occurs by sliding the rolling element with respect to the rolling element holder. Therefore, resistance in sliding the movable rail can be stably controlled.

In one aspect of the present disclosure, the biasing unit may be provided in the rolling element holder on a side that faces the second surface, and may be brought into contact with the second surface and elastically deformed so as to bias the rolling element holder.

According to the seat sliding device for conveyance as such, the rolling element holder can be biased by a simple configuration.

In one aspect of the present disclosure, the rolling element may comprise a shaft portion projecting in an axial direction of the rolling element. The rolling element holder may comprise a bearing portion that supports the shaft portion and extends in the longitudinal direction. The bearing portion may be inclined so as to approach the first surface as the bearing portion approaches the one side.

According to the seat sliding device for conveyance, the position of the rolling element in the up-down direction can be varied by a simple configuration.

In one aspect of the present disclosure, the shaft portion may project to both sides in an axial direction of the rolling element. The bearing portion may support the shaft portion on both sides in the axial direction of the rolling element.

According to the seat sliding device for conveyance as such, even if a load is applied to the rolling element, inclination of the rolling element can be inhibited.

In one aspect of the present disclosure, an end portion of the projection on the second surface side may be positioned closer to the one side than the contact point between the rolling element and the first surface.

According to the seat sliding device for conveyance as such, a difference in position of the projection in the up-down direction between when the rolling element is on the one side and when on the other side opposite to the one side can be increased. As a result, a difference between resistance in sliding the movable rail to the one side and resistance in sliding the movable rail to the other side opposite to the one side can be all the more increased.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

First Embodiment

1. Overall Configuration of Seat Sliding Device 1 for Vehicle

The overall configuration of a seat sliding device 1 for vehicle (hereinafter, "sliding device 1") will be described referring to FIGS. 1 to 5. The sliding device 1 shown in FIG. 1 is mounted on an automobile, and slides a seat of the automobile in a front-rear direction.

Figure 1:
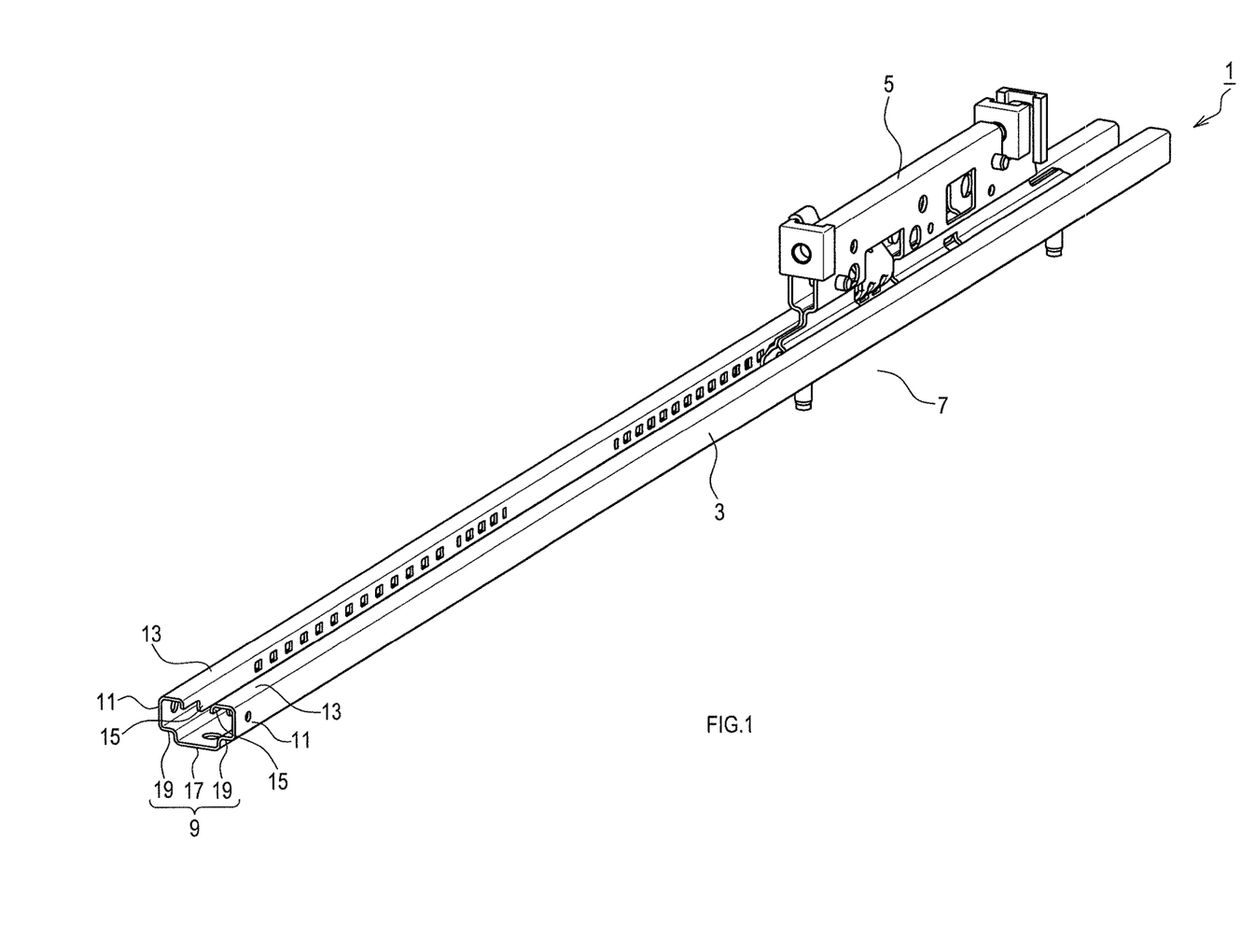
FIG. 1 is a perspective view showing a configuration of a seat sliding device for vehicle.

As shown in FIG. 1, the sliding device 1 comprises a lower rail 3 and an upper rail 5. The lower rail 3 corresponds to a fixed rail, and the upper rail 5 corresponds to a movable rail. The sliding device 1 comprises a combination of the lower rail 3 and the upper rail 5 on each side in a width direction of the seat. For convenience, FIG. 1 only shows the combination of the lower rail 3 and the upper rail 5 on the left side of a seat. The width direction corresponds to a width direction of the automobile.

The lower rail 3 is provided on a floor 7 side of the automobile. The lower rail 3 is a longitudinal member extending in the front-rear direction of the automobile. Accordingly, a longitudinal direction of the lower rail 3 coincides with the front-rear direction of the automobile.

As shown in FIGS. 1 to 4, the upper rail 5 is a longitudinal member extending in the front-rear direction of the automobile. Accordingly, a longitudinal direction of the upper rail 5 coincides with the front-rear direction of the automobile. An overall length of the upper rail 5 is shorter than that of the lower rail 3. The upper rail 5 slidably engages with the lower rail 3 in the front-rear direction of the automobile. The upper rail 5 is fixed to a not shown seat of the automobile at its upper part.

As shown in FIGS. 1 to 5, the lower rail 3 comprises a bottom wall 9, two side walls 11, two overhang portions 13, and two folded walls 15. The bottom wall 9 comprises a center bottom portion 17 located at the center in the width direction, and two outer bottom portions 19 located on both sides of the center bottom portion 17 in the width direction and raised by one level from the center bottom portion 17.

Each of the two side walls 11 is erected upward from an end portion of the corresponding outer bottom portion 19 on an outer side in the width direction. The outer side in the width direction means a direction moving away from the center of the upper rail 5 and the lower rail 3 in the width direction.

Each of the two overhang portions 13 bulges to an inner side in the width direction from an upper end of the corresponding side wall 11. The inner side in the width direction means a direction moving toward the center of the upper rail 5 and the lower rail 3 in the width direction. Each of the two folded walls 15 extends downward from an end portion of the corresponding overhang portion 13 on the inner side in the width direction.

As shown in FIGS. 2 to 5, the upper rail 5 comprises a body portion 21, two side walls 23, two extending portions 25, and two folded walls 27. The two side walls 23 extend downward from a lower part of the body portion 21. The two side walls 23 are spaced from each other in the width direction. Each of the two extending portions 25 bulges to the outer side in the width direction from a lower end of the corresponding side wall 23. Each of the two folded walls 27 extends upward from an end portion of the corresponding extending portion 25 on the outer side in the width direction.

Figure 5:
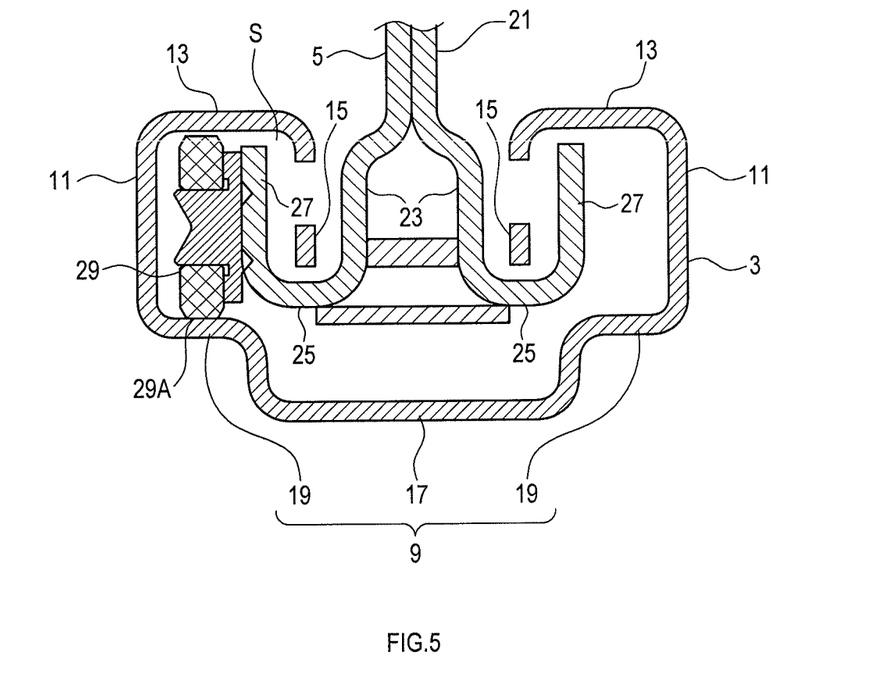
FIG. 5 is a cross-sectional view showing a configuration of a lower rail and the upper rail, at a cross section orthogonal to a front-rear direction and passing through a bearing.

As shown in FIG. 5, the two side walls 23 are inserted between the two folded walls 15. In addition, each of the two folded walls 27 is inserted upward between the corresponding side wall 11 and the corresponding folded wall 15. Therefore, the upper rail 5 is inhibited from falling off from the lower rail 3 in the up-down direction.

Figure 2:
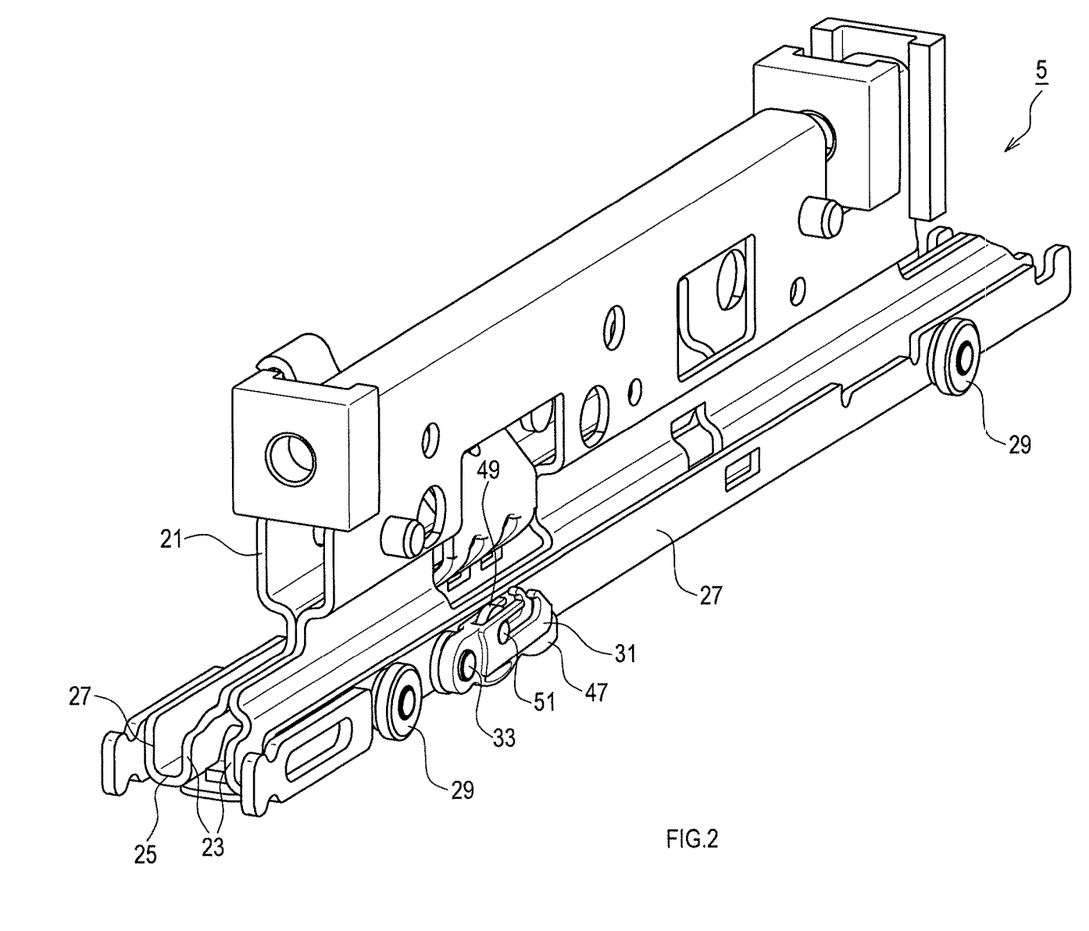
FIG. 2 is a perspective view showing a configuration of an upper rail.
Figure 3:
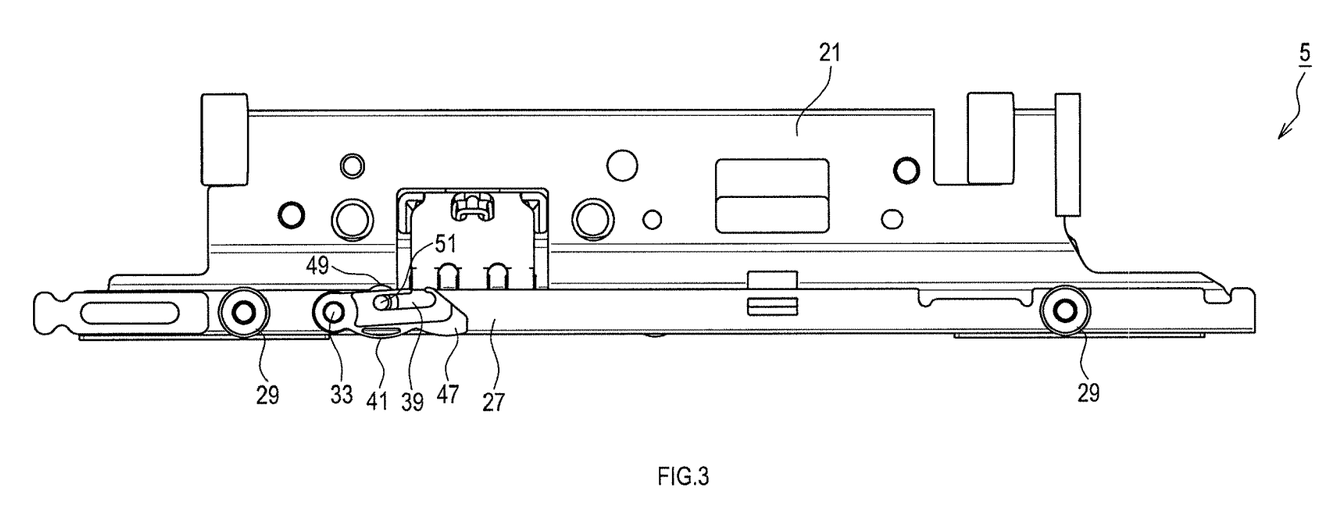
FIG. 3 is a side view showing a configuration of the upper rail.
Figure 4:
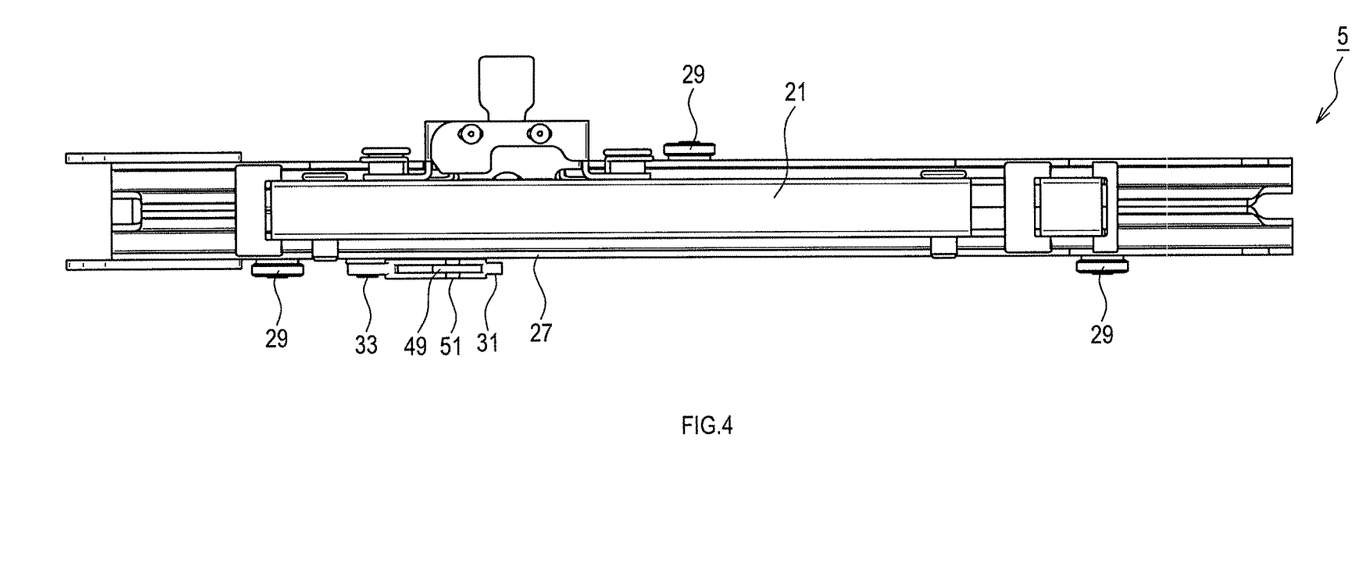
FIG. 4 is a plan view showing a configuration of an upper rail.

As shown in FIGS. 2 to 4, one bearing 29 is rotatably attached to each of a front-side portion and a rear-side portion of the left folded wall 27. In addition, another bearing 29 is rotatably mounted also in the vicinity of the center in the front-rear direction of the right folded wall 27. Since configuration and effect of the three bearings 29 are the same for all of the bearings 29, the bearing 29 attached to the front-side portion of the left folded wall 27 will be described here.

A rotation shaft of the bearing 29 is parallel to the width direction. As shown in FIG. 5, in the front view, the bearing 29 is in a space S surrounded by the folded wall 27, the overhang portion 13, the side wall 11, and the outer bottom portion 19. An outer peripheral surface 29A at a lower end of the bearing 29 is in contact with an upper surface of the outer bottom portion 19. When the upper rail 5 slides with respect to the lower rail 3, the bearing 29 rotates while in contact with the outer bottom portion 19.

2. Configuration of Rolling Element Holder 31, Etc.

The configuration of a rolling element holder 31 and the peripherals will be described referring to FIGS. 2 to 10. As shown in FIGS. 2 to 4 and 7, a shaft pin 33 is attached to a front-side portion of the left folded wall 27 and behind the bearing 29. The shaft pin 33 extends from the folded wall 27 to the outer side in the width direction. An axial direction of the shaft pin 33 is parallel to the width direction. The shaft pin 33 is preferably made of metal. The shaft pin 33 corresponds to a rotation shaft.

Figure 6:
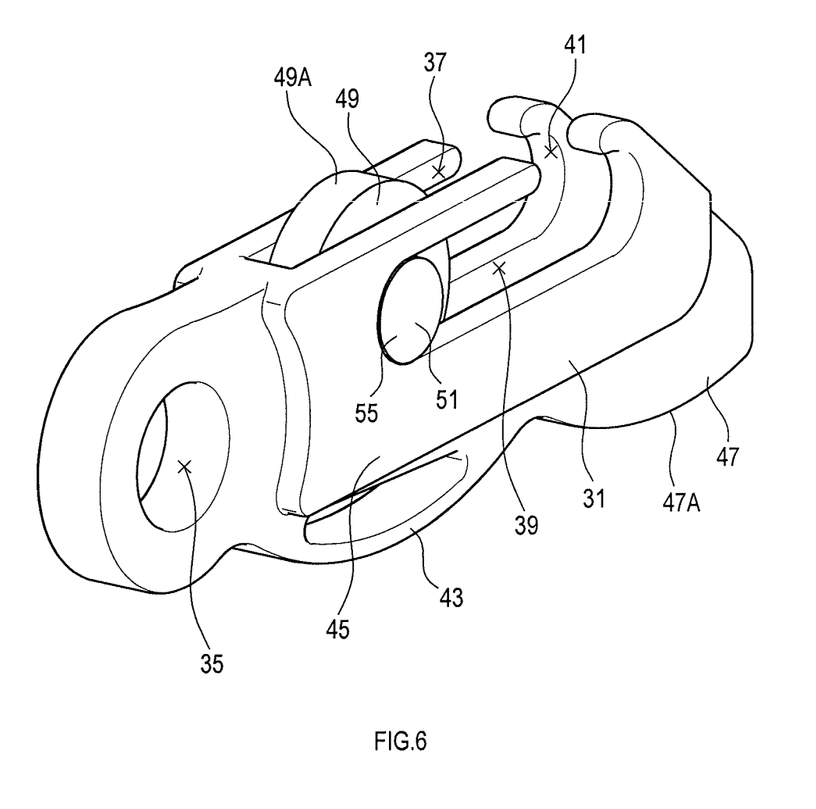
FIG. 6 is a perspective view showing a configuration of a rolling element holder, a roller, and a shaft pin.
Figure 7:
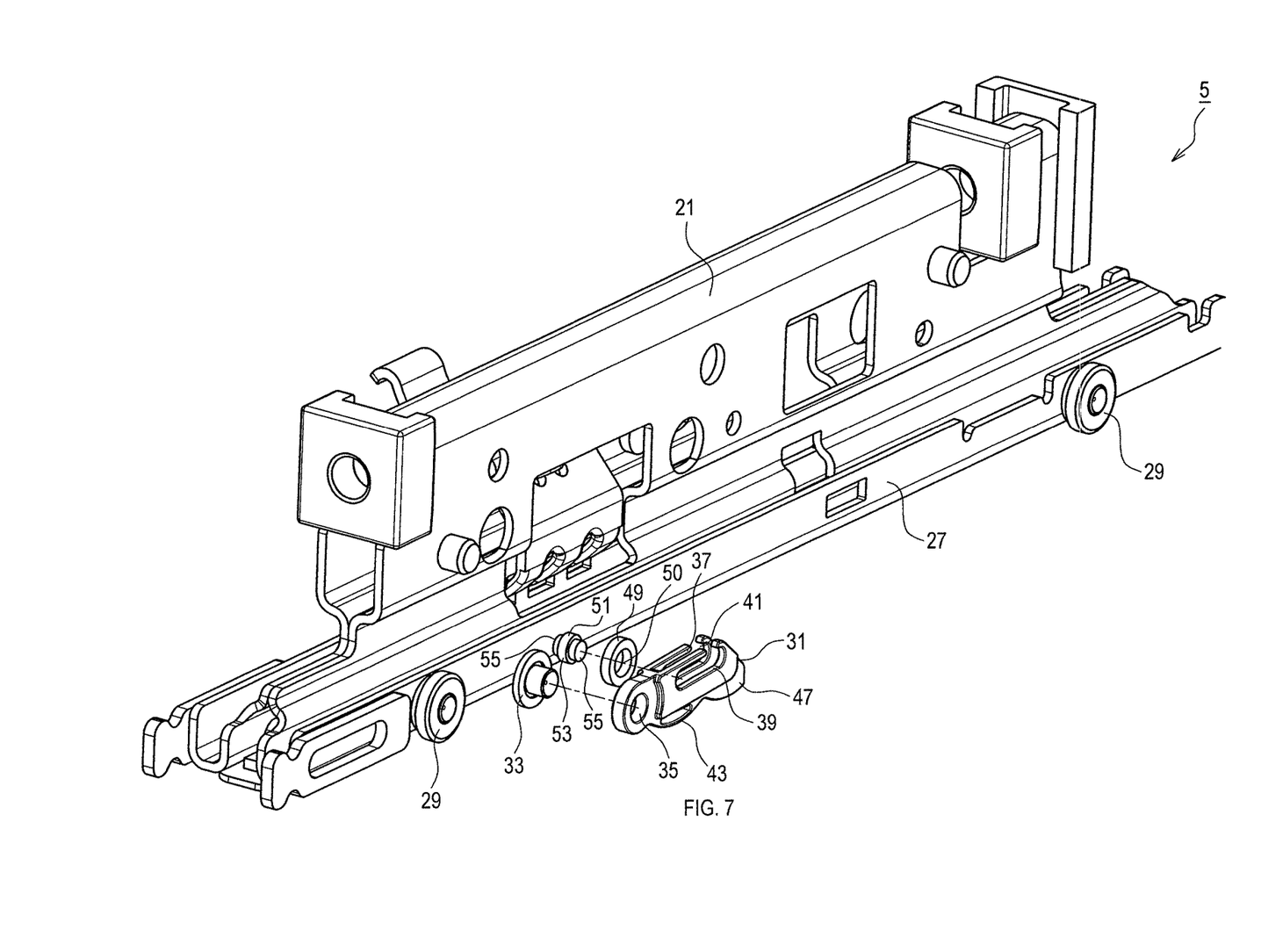
FIG. 7 is a perspective view showing the upper rail in a state in which the rolling element holder, the roller, and the shaft pin are disassembled.

The rolling element holder 31 is attached to the upper rail 5 via the shaft pin 33. The rolling element holder 31 is made of resin. As shown in FIGS. 6 and 7, the rolling element holder 31 comprises a first bearing hole 35 that penetrates the rolling element holder 31 in the width direction at a front-side portion of the rolling element holder 31. The first bearing hole 35 has a circular shape in the side view. The first bearing hole 35 has a diameter slightly larger than that of the shaft pin 33. When the shaft pin 33 is inserted to the first bearing hole 35, the rolling element holder 31 is attached to the upper rail 5. The rolling element holder 31 is rotatable about the shaft pin 33.

As shown in FIGS. 6 and 7, the rolling element holder 31 has a rolling element retaining groove 37. The rolling element retaining groove 37 is a groove extending downward from an upper surface of the rolling element holder 31. A width of the rolling element retaining groove 37 in the width direction is a width that allows accommodation of a later described roller 49. The rolling element retaining groove 37 extends in the front-rear direction in the top view. A front end of the rolling element retaining groove 37 is behind the first bearing hole 35.

As shown in FIGS. 6 and 7, the rolling element holder 31 has a second bearing hole 39 that penetrates the rolling element holder 31 in the width direction. The second bearing hole 39 is a long hole, a longitudinal direction of which substantially coincides with the front-rear direction. More specifically, when the rolling element holder 31 is attached to the upper rail 5, the second bearing hole 39 is inclined so as to be higher toward the rear. In other words, the second bearing hole 39 is inclined so as to approach the overhang portion 13 toward the rear. The second bearing hole 39 corresponds to a bearing portion. The rear corresponds to one side in a slidable range of the rolling element.

A diameter of the second bearing hole 39 in a longitudinal direction is sufficiently larger than that of a small diameter portion 55 described later. A diameter of the second bearing hole 39 in a direction orthogonal to the longitudinal direction is substantially the same at any location, and slightly larger than that of the small diameter portion 55 described later. In the side view, the second bearing hole 39 is in a position to overlap with a part of the rolling element retaining groove 37.

As shown in FIGS. 6 and 7, the rolling element holder 31 has an attachment groove 41 extending from a rear-side portion of the second bearing hole 39 to the upper surface. A width of the attachment groove 41 in the front-rear direction is larger than the diameter of the small diameter portion 55.

Figure 8:
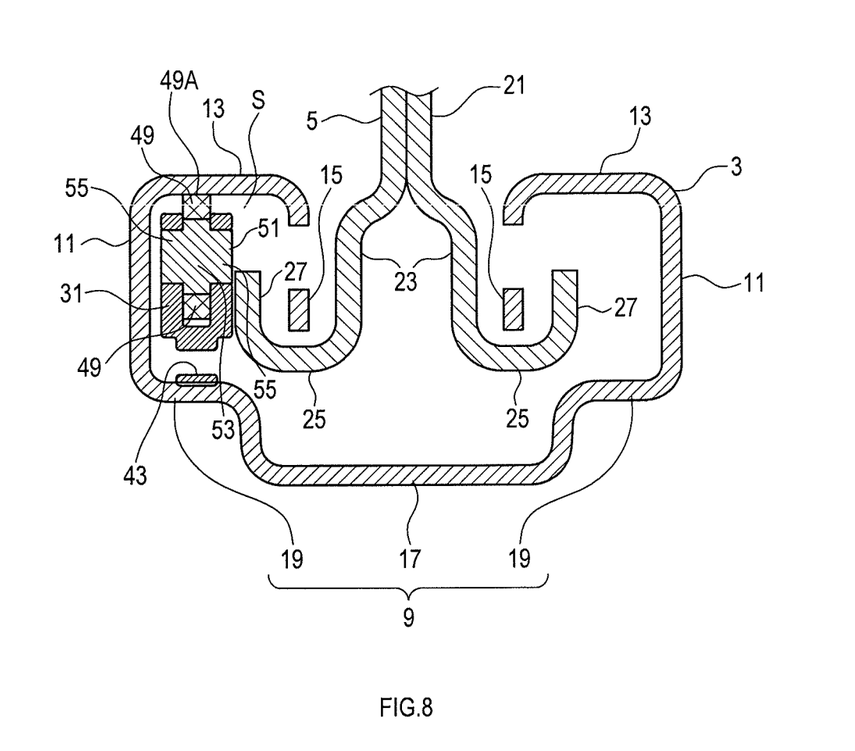
FIG. 8 is a cross-sectional view showing a configuration of the lower rail and the upper rail, at a cross section orthogonal to the front-rear direction and passing through the rolling element holder and the roller.
Figure 9:
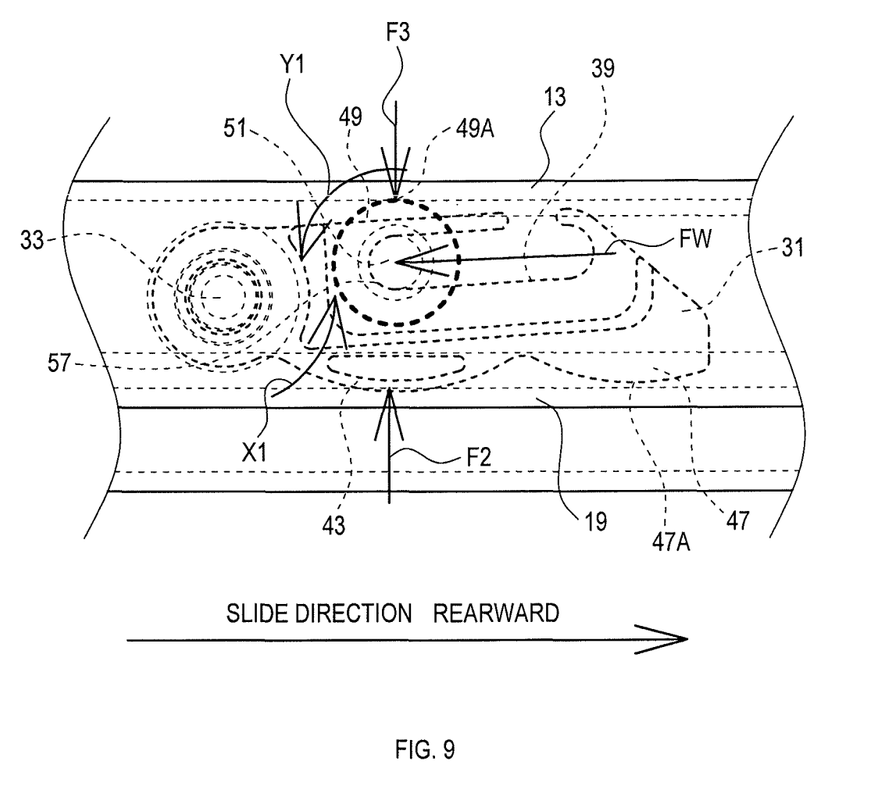
FIG. 9 is an explanatory view showing a state of the rolling element holder, the roller, and the shaft pin, when the upper rail slides rearward.
Figure 10:
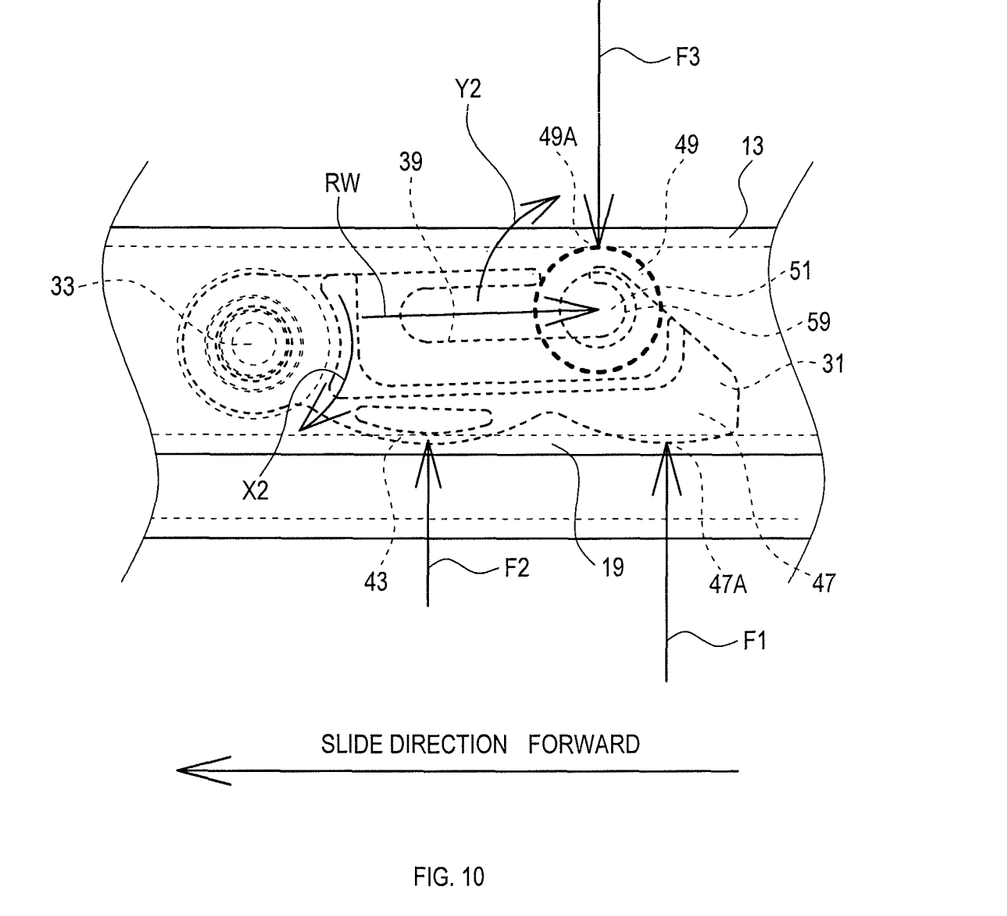
FIG. 10 is an explanatory view showing a state of the rolling element holder, the roller, and the shaft pin, when the upper rail slides forward.

As shown in FIGS. 6 and 7, a leaf spring 43 is preferably provided in the vicinity of the center in the front-rear direction on a lower surface of the rolling element holder 31. The leaf spring 43 is coupled to a main body 45 (portion other than the leaf spring 43) of the rolling element holder 31, and has a substantially arc shape bulging downward. The leaf spring 43 is positioned to the rear of the first bearing hole 35. As shown in FIGS. 8 to 10, the leaf spring 43 faces the outer bottom portion 19. The leaf spring 43 corresponds to a biasing unit.

As shown in FIGS. 6 and 7, a projection 47 projecting downward is provided in the vicinity of a rear end on the lower surface of the rolling element holder 31. The projection 47 has a substantially arc shape in the side view. The projection 47 is positioned behind the leaf spring 43 in the front-rear direction. In addition, the projection 47 is positioned behind an upper end 49A of the later described roller 49 in the front-rear direction. The projection 47 is preferably relatively rigid compared to the leaf spring 43.

As shown in FIGS. 6 and 7, the roller 49 and the shaft pin 51 are attached to the rolling element holder 31. As shown in FIG. 7, the roller 49 has an annular shape, in the center of which a circular hole 50 exists. The roller 49 is preferably made of a metal traveling shaft 51 and a resin roller 49, but may also be integrally made of a single material. The shaft pin 51 may comprise a large diameter portion 53 located at the center in the axial direction of the shaft pin 51, and two small diameter portions 55 (inner small diameter portion 55A and inner small diameter portion 55B) located on both sides in an axial direction of the large diameter portion 53.

The large diameter portion 53 preferably has a diameter substantially equal to a diameter of the circular hole 50. The large diameter portion 53 preferably has a width substantially equal to a width of the roller 49. The shaft pin 51 is preferably made of metal. The shaft pin 51 is attached to the roller 49 when the large diameter portion 53 is inserted to the circular hole 50. The two small diameter portions 55A and 55B project to opposite sides in an axial direction of the roller 49. The roller 49 is relatively rotatable around an axis of the shaft pin 51. The roller 49 and the shaft pin 51 correspond to a rolling element. The shaft pin 51 corresponds to a shaft portion.

As shown in FIGS. 6 and 7, the roller 49 is inserted into the rolling element retaining groove 37. At this time, the two small diameter portions 55A and 55B pass through the attachment groove 41 and are inserted into and supported by the second bearing hole 39. More specifically, a portion of the second bearing hole 39 on the inner side in the width direction from the rolling element retaining groove 37 supports the two small diameter portions 55A and 55B. Specifically, an inner upper surface 39A and an outer upper surface 39B of the slot 39 support two small diameter portions 55A and 55B respectively. In other words, the second bearing hole 39 supports the shaft pin 51 on both sides in the axial direction of the shaft pin 51. Therefore, the rolling element holder 31 holds the roller 49 and shaft pin 51, and the axial direction of the shaft pin 51 is parallel to the width direction.

The roller 49 is held by the rolling element holder 31 and is rotatable about the shaft pin 51. Therefore, as shown in FIGS. 9 and 10, the roller 49 and the shaft pin 51 are slidable along a front-rear direction of the slot 39. The upper end 49A of the roller 49 projects above the upper surface of the rolling element holder 31. The upper end 49A is on an outer peripheral surface of the roller 49. Play in the up-down direction of the shaft pin 51 with respect to the second bearing hole 39 is preferably relatively small.

As shown in FIG. 8, the shaft pin 51, the rolling element holder 31, and the roller 49 are accommodated in the space S, in the front view. The outer bottom portion 19 is opposite to the overhang portion 13 when viewed from the rolling element holder 31. As shown in FIGS. 8 to 10, the leaf spring 43 is brought into contact with (and upper surface of) the outer bottom portion 19, and is elastically deformed. As shown in FIGS. 9 and 10, the leaf spring 43 receives an upward reaction force from the outer bottom portion 19, and biases the rolling element holder 31. The biasing direction is a direction to rotate the rolling element holder 31 in an X1 direction (counterclockwise) about the shaft pin 33. The X1 direction is a direction in which the upper end 49A of the roller 49 approaches the overhang portion 13. Due to a biasing force of the leaf spring 43, the upper end 49A of the roller 49 is brought into contact with the overhang portion 13. The overhang portion 13 corresponds to a first surface. The outer bottom portion 19 corresponds to a second surface.

3. Operation of Rolling Element Holder 31, Etc.

As shown in FIG. 9, the upper end 49A of the roller 49 is in contact with the overhang portion 13 on the lower rail 3 side. As shown in FIG. 9, when the upper rail 5 slides rearward, the overhang portion 13 relatively moves forward with respect to the roller 49. Therefore, the roller 49 rotates in a Y1 direction about the shaft pin 51. Also, the shaft pin 51 rolls forward FW while rotating in the Y1 direction inside the second bearing hole 39. Consequently, the roller 49 and the shaft pin 51 slide forward FW with respect to the rolling element holder 31. Then, as shown in FIG. 9, the shaft pin 51 reaches a front end in the second bearing hole 39. The position of the roller 49 and the shaft pin 51 at the time is hereinafter referred to as a front end position.

When the upper rail 5 slides rearward, the roller 49 and the shaft pin 51 reach the front end position, at the beginning of the sliding, by the above-described movement. When the upper rail 5 further slides rearward after the roller 49 and the shaft pin 51 reach the front end position, the roller 49 and the shaft pin 51 remain positioned at the front end position. Therefore, when the upper rail 5 slides rearward, the roller 49 and the shaft pin 51 are positioned at the front end position, except for a period during which the roller 49 and the shaft pin 51 slide to the front end position.

In the rolling element holder 31, a position of the second bearing hole 39 in the up-down direction becomes lower toward the front, and the lowest at a front end 57. Therefore, a relative position of the roller 49 and the shaft pin 51 in the up-down direction with respect to the rolling element holder 31 becomes lower as the roller 49 and the shaft pin 51 slide forward FW, and the lowest when the roller 49 and the shaft pin 51 are at the front end position. Consequently, a distance in the up-down direction from a contact point (i.e., upper end 49A) between the roller 49 and the overhang portion 13 to an end portion 47A on a lower side of the projection 47 becomes smaller as the roller 49 and the shaft pin 51 slide forward FW, and becomes smallest when the roller 49 and the shaft pin 51 are at the front end position.

The position of the upper end 49 in the up-down direction with respect to the lower rail 3 is always constant. Also, as noted above, when the roller 49 and the shaft pin 51 are at the front end position, the distance in the up-down direction from the upper end 49A to the end portion 47A becomes the smallest. Therefore, as shown in FIG. 9, when the roller 49 and the shaft pin 51 are at the front end position, the position of the end portion 47A in the up-down direction with respect to the lower rail 3 becomes the highest, and the end portion 47A is spaced from the outer bottom portion 19. Consequently, when the roller 49 and the shaft pin 51 are at the front end position, resistance in sliding the upper rail 5 becomes small.

As described above, when the upper rail 5 slides rearward, the roller 49 and the shaft pin 51 are at the front end position, except for the period during which the roller 49 and the shaft pin 51 slide to the front end position. In view of this, when the upper rail 5 slides rearward, resistance in sliding the upper rail 5 becomes small, except for the period during which the roller 49 and the shaft pin 51 slide to the front end position.

As shown in FIG. 10, the upper end 49A of the roller 49 is in contact with the overhang portion 13 on the lower rail 3 side. As shown in FIG. 10, when the upper rail 5 slides forward, the overhang portion 13 relatively moves rearward with respect to the roller 49. Therefore, the roller 49 rotates in a Y2 direction (clockwise) about the shaft pin 51. Also, the shaft pin 51 rolls rearward RW while rotating to the Y2 direction inside the second bearing hole 39. Consequently, the roller 49 and the shaft pin 51 slide rearward RW with respect to the rolling element holder 31. Then, as shown in FIG. 10, the shaft pin 51 reaches a rear end 59 in the second bearing hole. The position of the roller 49 and the shaft pin 51 at this time is hereinafter referred to as a rear end position.

When the upper rail 5 slides forward, roller 49 and the shaft pin 51 reach the rear end position by the above-described movement. When the upper rail 5 further slides further forward after the roller 49 and the shaft pin 51 reach the rear end position, the roller 49 and the shaft pin 51 remain positioned at the rear end position. Therefore, when the upper rail 5 slides forward, the roller 49 and the shaft pin 51 are generally positioned at the rear end position, except for an initial period during which the roller 49 and the shaft pin 51 slide to the rear end position. The term "slide" in this context means slide, or roll, or both slide and roll.

In the rolling element holder 31, the position of the second bearing hole 39 in the up-down direction becomes higher toward the rear, and the highest at the rear end 59. Therefore, a relative position of the roller 49 and the shaft pin 51 in the up-down direction with respect to the rolling element holder 31 becomes higher as the roller 49 and the shaft pin 51 slide rearward RW, and the highest when the roller 49 and the shaft pin 51 are at the rear end position. Consequently, a distance in the up-down direction from the contact point (i.e., upper end 49A) between the roller 49 and the overhang portion 13 to the end portion 47A on the lower side of the projection 47 becomes larger as the roller 49 and the shaft pin 51 slide rearward RW, and the largest when the roller 49 and the shaft pin 51 are at the rear end position.

The position of the upper end 49A in the up-down direction with respect to the lower rail 3 is always constant. Also, as noted above, when the roller 49 and the shaft pin 51 are at the rear end position, the distance in the up-down direction from the upper end 49A to the end portion 47A becomes the largest. Therefore, as shown in FIG. 10, when the roller 49 and the shaft pin 51 are at the rear end position, the position in the up-down direction of the end portion 47A with respect to the lower rail 3 becomes the lowest, and the end portion 47A is brought into contact with the outer bottom portion 19. Then, an upward reaction force F1 by the outer bottom portion 19 is applied to the end portion 47A. Consequently, when the roller 49 and the shaft pin 51 are at the rear end position, resistance in sliding the upper rail 5 becomes large. As the roller 49 and the shaft pin 51 move towards the rear end position, the rolling element holder 31 rotates in the X2 direction (clockwise) about the shaft pin 33.

As described above, when the upper rail 5 slides forward, the roller 49 and the shaft pin 51 are at the rear end position, except for the period during which the roller 49 and the shaft pin 51 slide to the rear end position. In view of this, when the upper rail 5 slides forward, resistance in the sliding of the upper rail 5 becomes large, except during the initial/transitional period during which the roller 49 and the shaft pin 51 slide to the rear end position.

As shown in FIGS. 9 and 10, even when the upper rail 5 slides to either direction, an upward reaction force F2 by the outer bottom portion 19 is applied to the leaf spring 43. Further, a downward reaction force F3 by the overhang portion 13 is applied to the roller 49. Therefore, even when the upper rail 5 slides to either direction, a frictional force between the leaf spring 43 and the outer bottom portion 19, and a rotational resistance of the roller 49, are produced.

3. Effect Produced by Sliding Device 1

The sliding device 1 produces the following effects (1A) to (1F).

(1A) The sliding device 1 can decrease resistance in sliding the upper rail 5 rearward, and increase the resistance in sliding the upper rail 5 forward.

(1B) Change in resistance in sliding the upper rail 5 occurs by sliding of the roller 49 and the shaft pin 51 with respect to the rolling element holder 31. Sliding of the roller 49 and the shaft pin 51 with respect to the rolling element holder 31 is caused by the shaft pin 51 rolling inside the second bearing hole 39. Therefore, sliding of the roller 49 and the shaft pin 51 to the front end position or to the rear end position is smooth. Consequently, resistance in the sliding of the upper rail 5 can be stably controlled.

(1C) The leaf spring 43 is provided in the rolling element holder 31 on a side adjacent to the outer bottom portion 19. The leaf spring 43 is brought into contact with the outer bottom portion 19 and is elastically deformed so as to bias the rolling element holder 31 in an upward direction. Therefore, biasing of the rolling element holder 31 can be implemented by a simple configuration.

(1D) The shaft pin 51 comprises the two small diameter portions 55A and 55B projecting in the axial directions of the roller 49. The second bearing hole 39 of the rolling element holder 31 supports the two small diameter portions 55. The second bearing hole 39 is slightly inclined so as to approach the overhang portion 13 toward the rear. Therefore, heights of the roller 49 and the shaft pin 51 can be changed by a simple configuration.

(1E) The two small diameter portions 55A and 55B of the shaft pin 51 project to opposite sides in the axial direction of the roller 49. The second bearing hole 39 supports the two small diameter portions 55 on both sides in the axial direction of the roller 49. Therefore, even if a load is applied to the roller 49, the roller 49 and the shaft pin 51 are inhibited from being inclined.

(1F) The end portion 47A of the projection 47 contacts the outer bottom portion 19 side and is positioned behind the contact point between the roller 49 and the overhang portion 13. Therefore, difference in position of the projection 47 in the up-down direction between when the roller 49 and the shaft pin 51 is at the front end position and when at the rear end position can be increased. Consequently, difference between the resistance in sliding the upper rail 5 rearward and the resistance in sliding the upper rail 5 forward can be increased.

Other Embodiments

Although the embodiment for carrying out the present disclosure has been described above, the present disclosure is not limited to the above-described embodiment, and various modifications can be made.

(1) Instead of the roller 49 and the shaft pin 51, another rolling element may be used. Other rolling elements include, for example, a bearing or a disc member.

(2) The front-rear direction of the rolling element holder 31 may be opposite to that of the first embodiment. That is, the shaft pin 33 may pivotally supports a rear-side portion of the rolling element holder 31. The rolling element retaining groove 37, the second bearing hole 39, the roller 49, the shaft pin 51, the leaf spring 43, and the projection 47 are located in front of the shaft pin 33. The second bearing hole 39 is inclined so as to be higher toward the front. In this case, the sliding device 1 can decrease resistance in sliding the upper rail 5 forward, and increase the resistance in sliding the upper rail 5 rearward.

(3) A biasing unit other than the leaf spring 43 may be used. For example, a spiral spring may be used. Also, a leaf spring may be provided in a portion of the rolling element holder 31 in front of the first bearing hole 35 and opposite to the overhang portion 13. This leaf spring is brought into contact with the overhang portion 13 and is elastically deformed so as to receive a downward reaction force. Due to the reaction force, the rolling element holder 31 is biased to rotate in the X1 direction.

(4) The shaft pin 51 may comprise the small diameter portion 55 only on one side in the axial direction of the roller 49. In this case, the rolling element holder 31 supports the small diameter portion 55 by a cantilever method.

(5) The end portion 47A may be positioned in front of the contact point between the roller 49 and the overhang portion 13.

(6) The projection 47 may be brought into contact with the outer bottom portion 19 even when the roller 49 and the shaft pin 51 are at the front end position, provided that the reaction force F1 that the projection 47 receives from the outer bottom portion 19 is smaller when the roller 49 and the shaft pin 51 are at the front end position than when at the rear end position.

(7) In the above-described embodiments, the sliding device 1 is applied to an automobile. The sliding device 1 may be used in a vehicle other than automobiles (for example, railroad vehicles, airplanes, ships, etc.)

(8) Functions of a single component in each of the above embodiments may be implemented by a plurality of components. Also, functions of a plurality of components may be implemented by a single component. In addition, a part of the configuration of the above embodiments may be omitted. Further, at least a part of the configuration of the above embodiments may be added to or replaced with the configuration of the other embodiment described above. It is to be noted that all aspects included in the technical concept specified only by the language in the claims are embodiments of the present disclosure.

What is claimed is:

1. A seat sliding device for conveyance that slides a seat, the seat sliding device comprising:
a fixed rail provided on a floor side of the conveyance;
a movable rail slidably engaging with the fixed rail and attached to the seat;
a rolling element;
a rolling element holder attached to the movable rail so as to be rotatable about a rotation shaft provided on the movable rail, and holding the rolling element rotatably and slidably in a longitudinal direction of the movable rail;
a biasing unit that biases the rolling element holder so that the rolling element rotates about the rotation shaft in a direction in which an outer peripheral surface of the rolling element approaches a first surface of the fixed rail; and a projection provided on the rolling element holder, and facing a second surface opposite to the first surface of the fixed rail, the rolling element holder being configured so that a distance in an up-down direction from a contact point between the rolling element and the first surface to an end portion of the projection facing the second surface becomes larger as the rolling element approaches an end on one side of the rolling element holder in a slidable range of the rolling element, and so that the projection is brought into contact with the second surface at least when the rolling element is at the end on the one side of the rolling element holder.

2. The seat sliding device for conveyance according to claim 1, wherein the biasing unit is provided in the rolling element holder on a side that faces the second surface, and is brought into contact with the second surface and elastically deformed so as to bias the rolling element holder away from the second surface.

3. The seat sliding device for conveyance according to claim 1, wherein the rolling element comprises a shaft portion that projects in an axial direction of the rolling element, the rolling element holder comprises a bearing portion that supports the shaft portion and extends in the longitudinal direction of the movable rail, and the bearing portion is inclined so as to approach the first surface as the bearing portion approaches the one side.

4. The seat sliding device for conveyance according to claim 3, wherein the shaft portion projects from both sides of the rolling element in an axial direction of the rolling element, and the bearing portion supports the shaft portion from both sides of the rolling element in the axial direction of the rolling element.

5. The seat sliding device for conveyance according to claim 1, wherein the end portion of the projection facing the second surface is positioned closer to the one side of the rolling element holder than the contact point between the rolling element and the first surface.

* * * * *